Jan. 9, 1940.    J. A. REIDENBACH    2,186,345
POTATO CHIP FRYER AND AGITATOR
Filed May 17, 1939
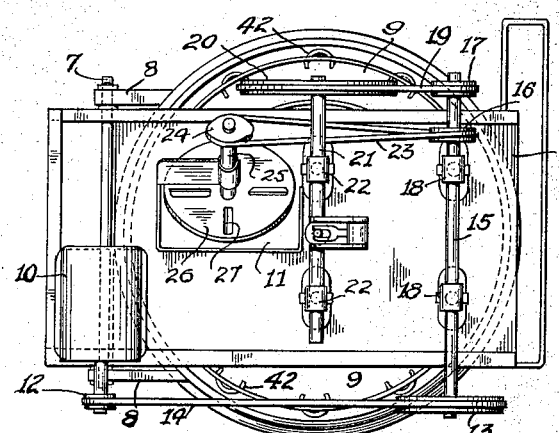
INVENTOR:
Jordan A. Reidenbach
BY Hangood & Van Horn
HIS ATTORNEYS.

Patented Jan. 9, 1940

2,186,345

UNITED STATES PATENT OFFICE 2,186,345

POTATO CHIP FRYER AND AGITATOR

Jordan A. Reidenbach, Ashland, Ohio

Application May 17, 1939, Serial No. 274,269

3 Claims. (Cl. 259—113)

My invention is an improvement in machines for cooking foods, and relates more particularly to a machine for frying potato chips, or the like.

One of the objects of my invention is to provide in a machine of the class described a means for agitating the food particles within the container during the frying operation, such means being so arranged and operated that delicate particles of food, such as potato chips, may be thoroughly agitated during frying, without danger of excessive breakage of the chips.

A further object of the invention is to provide an agitator means for agitating potato chips during the frying process in a container whereby the chips will be more or less continuously turned over in the frying medium so that the heat treatment of the same will be substantially uniform throughout the mass being fried.

A further object of the invention consists in providing a fryer for potato chips in which power driven means may be employed to actuate a slicer for supplying fresh chips to the container and for reciprocating an agitator within the container for turning the chips during frying operation.

A further object consists in providing a vat or other container for holding the grease and chips which are fried therein and to provide a removable cover for the container, said cover carrying a chip agitating means thereon which may be removed from the container upon removal of the cover.

A still further object of the invention is to provide a device for economically frying potato chips which is simple of construction, convenient to operate, and inexpensive to manufacture, and which possesses the further characteristic of avoiding burning of the chips or uneven frying thereof.

Other objects and advantages of my invention will become more apparent as the following description of an embodiment thereof progresses, reference being made to the accompanying drawing, in which like reference characters are employed to designate like parts throughout the same.

In the drawing:

Figure 1 is a side elevation of a machine embodying my invention, in which certain of the parts are shown in cross section;

Figure 2 is a top plan view of the same;

Figure 3 is a partial side elevation of the machine showing the cover in open position and the agitator means withdrawn from the container;

Figure 4 is a transverse section in the direction of line 4—4 of Figure 1, and shows the agitator means in plan view;

Figure 5 is a view taken in the direction of line 5—5 of Figure 1; and

Figure 6 is an enlarged fragmentary view taken in the line 6—6 of Figure 1.

In carrying out my invention in accordance with the embodiment shown in the drawing, I provide a cooker comprising a burner compartment 1 and a container 2 which is adapted to telescope partially into the open top of the lower compartment.

A gas or other burner 3 is provided within the member 1 so that the flame will be positioned properly to efficiently heat the bottom of the container 2 when the latter is in the position shown. The container 2 is provided with a rolled flange or bead 4 near its bottom end which supports the container at 5 in the compartment 1.

The container 2 is adapted to receive the proper quantity of lard or other frying medium in which the potato chips or other particles of food are fried. The level of the grease is preferably such that the fingers of the agitator will be immersed therein when the agitator is in its lowermost position.

There is provided a cover 6 for the receptacle 2 which is hinged at 7 to a bracket 8 mounted on the body 1. The cover 6 need not completely cover the open end of the container, but may form openings 9 on opposite sides thereof through which the progress of the frying may be observed.

Supported on the hinged cover 6 are a motor 10 having connection with a source of electric power, a power transmission to the agitator and an agitator mechanism. A potato slicer indicated at 11 may also be supported by the cover and driven by the motor simultaneously with the agitator.

The motor 10 carries a driving pulley 12 which drives the pulley 13 through the belt 14. The pulley 13 drives the cross shaft 15 and the pulleys 16 and 17 keyed thereto.

The shaft 15 is mounted to rotate in suitable bearings 18 supported on the cover. A belt 19 connects the pulleys 17 and 20, the latter being keyed to drive the crank shaft 21 mounted in the bearings 22 on the cover 6.

It is to be noted that the diameters of the pulleys 12, 13, 17, and 20 are such that a suitable speed reduction is imparted through this transmission to the crank shaft 21.

As illustrated in Figures 1 and 2, I may employ the use of a slicer 11 which is also driven through the transmission. A belt 23 connects the pulleys 16 and 24 for rotating the cutter shaft 25. A cutter disc 26 is carried by the shaft 25 and is provided with a plurality of radial cutters 27.

Potatoes fed into the hopper 11 will be engaged by the rotating cutter disc and the slices thus formed will drop through the open bottom of the hopper and into the grease container 2.

My invention contemplates the provision of a novel means for agitating the chips or other particles of food which are to be cooked or fried within the container 2. One form of agitating means embodying my invention is clearly shown in the accompanying drawing and may include an agitator frame preferably formed of wire and having connection with the crank shaft 21 whereby the agitator may be reciprocated vertically in the container 2.

The wire frame includes preferably a concentric series of rings 30, 31, and 32, there being a plurality of rods 33 extending transversely of the entire series and attached thereto, as by spot welding, so that the rings will be held together rigidly in concentric spaced relation as shown.

I have provided a second pair of rods 34 bridging the inner ring 30 and connected at one end with the ring 31 as at 35. At 36 there is provided a projection or stop extending from the ring 31 toward the ring 30 and is located in the path of movement of the supporting plate 37. As indicated in the figures, the plate 37 is formed of sheet metal and is provided with downwardly turned flanges 38 along opposite sides. The rods 34 loosely pass through aligned openings in these flanges and thus permit the frame comprising the rings 30, 31 and 32 and the rods 33 and 34 to slide normal to the axis of the rings. Sliding motion is limited in one direction by the stop 36 which will engage one of the flanges 38 of the plate 37.

This sliding motion of the frame is desirable to more readily permit the cover 6 to be raised. In raising the cover from the position shown in Figure 1 to open position, as in Figure 3, the wire frame will slide to the position shown in Figure 3, thus preventing any binding effect of the frame within the container 2 as it is tilted in raising the cover.

The driven shaft 21 is provided with a crank arm 39 which is pivotally connected by means of a connecting rod 40 with the plunger 41. The lower end of the plunger 41 is removably secured to and carries the plate 37 and the rest of the agitator mechanism.

Each of the concentric rings is provided with a plurality of light resilient fingers 42 which project downwardly from the respective rings. As the crank shaft revolves, the fingers 42 will be immersed in the grease and removed intermittently.

The fingers 42 may be formed in the shape of wire loops, the lower portions being bent or turned to form a lip 43.

It will therefore be apparent from the disclosure that as the fingers 42 are repeatedly immersed in the grease, they will contact the chips floating therein and will thus insure a more uniform cooking of the chips.

The chips will not only be moved around in the grease, but will be turned over time and again until the entire mass is thoroughly and evenly cooked. Furthermore, by my apparatus I am enabled to handle rather large quantities of chips at a time without danger of breakage to the chips during agitation.

Various changes in the details of construction and arrangement of parts may be made without departing from the spirit of my invention or the scope of the appended claims.

I claim:

1. In a food cooker, a container, a support hinged to the container, an agitator depending from the support and movable axially within the container, means on the support for moving the agitator axially of the container, said agitator being movable independently of the support in a transverse direction when the support is swung to withdraw the agitator from the container, said agitator including a frame comprising a plurality of ring members, transverse members for supporting said rings in spaced relation, fingers depending from said rings for engagement with the food in the container whereby to uniformly and thoroughly immerse the food particles in a cooking medium in the container during a cooking operation.

2. In a machine for frying fragile foods such as potato chips, a container for the chips and a frying medium, a reciprocable member operating in the container, and means operated by the member for gently agitating and turning the chips or the like at or near the surface of the frying medium, said means including an open framework normal to the axis of the container, said frame comprising concentric rings and a plurality of resilient fingers depending from each of said rings and adapted to gently engage the food particles at or near the surface of the frying medium.

3. A cooking apparatus for fragile foods such as potato chips comprising a container for the food and a cooking medium, a cover for the container and an agitator depending from the cover axially into the container and operable axially therein, said agitator comprising a reciprocable rod and a wire framework consisting of a plurality of rings, resilient fingers depending from the rings for engagement with the food particles in the cooking medium, said framework being slidable independently of the rod and in a transverse direction thereto.

JORDAN A. REIDENBACH.